United States Patent
Wolfson et al.

(10) Patent No.: US 10,778,426 B1
(45) Date of Patent: Sep. 15, 2020

(54) VALIDATION OF SENSOR DATA USING A BLOCKCHAIN

(71) Applicant: EMC IP Holding Company LLC, Hopkinton, MA (US)

(72) Inventors: Kfir Wolfson, Beer Sheva (IL); Assaf Natanzon, Tel Aviv (IL); Jehuda Shemer, Kfar Saba (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 232 days.

(21) Appl. No.: 15/940,238

(22) Filed: Mar. 29, 2018

(51) Int. Cl.
*H04L 29/06* (2006.01)
*H04L 9/08* (2006.01)
*H04L 9/30* (2006.01)

(52) U.S. Cl.
CPC ............ *H04L 9/088* (2013.01); *H04L 9/3006* (2013.01)

(58) Field of Classification Search
None
See application file for complete search history.

(56) References Cited

U.S. PATENT DOCUMENTS

| | | | |
|---|---|---|---|
| 2018/0012311 A1* | 1/2018 | Small | B33Y 50/02 |
| 2018/0167200 A1* | 6/2018 | High | H04L 9/3239 |
| 2018/0183606 A1* | 6/2018 | High | H04L 9/3239 |
| 2019/0026716 A1* | 1/2019 | Anbukkarasu | G06Q 20/206 |
| 2019/0268162 A1* | 8/2019 | Sahagun | H04L 67/22 |

OTHER PUBLICATIONS

Sudhan, Amool; Nene, Manisha J. Employability of Blockchain Technology in Defence Applications. 2017 International Conference on Intelligent Sustainable Systems (ICISS). https://ieeexplore.ieee.org/stamp/stamp.jsp?tp=&arnumber=8389247 (Year: 2017).*

Kravitz, David W. Transaction Immutability and Reputation Traceability: Blockchain as a Platform for Access-controlled IoT and Human Interactivity. 2017 15th Annual Conference on Privacy, Security and Trust (PST). https://ieeexplore.ieee.org/stamp/stamp.jsp?tp=&arnumber=8476873 (Year: 2017).*

(Continued)

*Primary Examiner* — Jeremiah L Avery
(74) *Attorney, Agent, or Firm* — Ryan, Mason & Lewis, LLP (57) ABSTRACT

Techniques are provided for validating sensor data using a blockchain. An exemplary method comprises: obtaining sensor data from a sensor; retrieving a transaction identifier from a blockchain; saving one or more public properties of the sensor and the transaction identifier in an output metadata stream; calculating a signature of the obtained sensor data, the one or more public properties of the sensor and the transaction identifier; saving the signature in the output metadata stream; and storing the signature encrypted with a private key of the sensor as a transaction in the blockchain. An exemplary validation of sensor data comprises decrypting the encrypted signature from the blockchain using a public key of the sensor and comparing the decrypted signature with a signature of the sensor data obtained from the output metadata stream.

20 Claims, 7 Drawing Sheets

(56) References Cited

OTHER PUBLICATIONS

Aste, Tomaso et al. Blockchain Technologies: The Foreseeable Impact on Society and Industry. Computer, vol. 50, Issue: 9. https://ieeexplore.ieee.org/stamp/stamp.jsp?tp=&arnumber=8048633 (Year: 2017).*

Wright, Craig; Serguieva, Antoaneta. Sustainable blockchain-enabled services: Smart contracts. 2017 IEEE International Conference on Big Data (Big Data). https://ieeexplore.ieee.org/stamp/stamp.jsp?tp=&arnumber=8258452 (Year: 2017).*

* cited by examiner

VALIDATION OF SENSOR DATA USING A BLOCKCHAIN

FIELD

The field relates generally to the processing of sensor data.

BACKGROUND

The Internet of Things (IoT) is a network of distributed physical devices, such as vehicles and sensors, that exchange data over the network. The sensors generate sensor data comprising information regarding a number of diverse physical variables. Such information is useful for a wide range of applications, such as surveillance and other law enforcement applications, medical monitoring, transportation monitoring, habitat monitoring, factory control, and pipeline integrity.

As society grows increasingly dependent on such sensor data, the validity and integrity of the gathered sensor data becomes critical. In the field of criminal justice, for example, it is often important to identify the particular sensor that captured incriminating data (e.g., a specific surveillance camera), and to verify the integrity of the data, the location of the particular sensor and/or the particular time when the data was obtained.

A need therefore exists for techniques for validating such sensor data.

SUMMARY

Illustrative embodiments of the present disclosure provide techniques for validating sensor data using a blockchain. In one embodiment, an exemplary method comprises: obtaining sensor data from a sensor; retrieving a transaction identifier from a blockchain; saving one or more public properties of the sensor and the transaction identifier in an output metadata stream; calculating a signature of the obtained sensor data, the one or more public properties of the sensor and the transaction identifier; saving the signature in the output metadata stream; and storing the signature encrypted with a private key of the sensor as a transaction in the blockchain, wherein the encrypted signature is decrypted using a public key of the sensor to validate the sensor data.

In some embodiments, a transaction identifier associated with a substantially most recent transaction is retrieved from the blockchain. In at least one embodiment, a validation of sensor data further comprises the steps of obtaining the sensor data from an output data stream and corresponding metadata from the output metadata stream; using a transaction identifier from the corresponding metadata to obtain a corresponding transaction from the blockchain, wherein the corresponding transaction comprises the encrypted signature; decrypting the encrypted signature from the blockchain using a public key of the sensor; and comparing the decrypted signature with the signature of the sensor data obtained from the output metadata stream to establish that the obtained sensor data came from the sensor. The validation of the sensor data validates a source of the sensor data, a location of the source of the sensor data, and/or a time the sensor data was obtained.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. Accordingly, the term "sensor" as used herein is intended to be broadly construed, so as to encompass, for example, sensors designed specifically for a specific purpose, such as thermometers, cameras and smoke detectors, as well as general-purpose devices, such as smartphones and tablets that perform a sensing function.

As noted above, establishing that the source of information is legitimate and accurate has always been a challenge. In the physical world, detectives and criminal forensic professionals are often required to use scientific methods to prove, for example, that a certain page was printed by a specific printer, or geometric properties to prove that a camera was located at a certain place looking at a specific angle. The time of a crime is also hard to assess and can, for example, be obtained by estimating a time of death of a murder victim.

In an IoT sensor environment, similar problems exist, and additional problems are added. As noted above, with the proliferation of IoT, sensor data comprises information regarding diverse physical variables from numerous information sources. Data validation is more complex, since data can easily be generated by other means, or compromised after a malicious actor accesses a database that holds the saved sensor information.

In some embodiments, there is a need for an irrevocable proof that a particular IoT sensor recorded particular sensor data before a specific time. In some cases, proactive actions are taken such that the data will include some proof, for example, by holding up a current newspaper in front of a recording camera. Such a manual solution is not sustainable or scalable, however, and does not apply to the general case of various IoT sensors recording different types of data in various remote locations.

It is also noted that a simple clock recorded on top of a video feed is typically not sufficiently reliable. The clock time can be moved or reset, and third parties (e.g., defense attorneys) might have a legitimate claim about a lack of proof that the timestamp is indeed correct.

In addition, in order to capture the actual time that data was recorded, the end time of the data stream has to be proven as well. For example, a video can be recorded while holding up a newspaper from January 1$^{st}$, but there is a problem verifying that the recording was not done on January 2$^{nd}$ (or later).

With the increasing rate of IoT sensor installations, there is a need to irrevocably confirm which sensor had recorded a particular data set. This origin sensor information can help to show that the origin sensor device was not tampered with and the recorded data is intact and reliable.

One of the many benefits of sensors is their mobility. To address concerns regarding the exact location of the sensor at a time of recording, however, there is a need for a mechanism for proving the geo-location of the origin sensor at any given time. This also applies to other properties of the device, such as a direction that a camera is facing.

In one or more embodiments, a mechanism is provided for demonstrating that the recorded data was not changed between a time of recording and a time of replaying the data as evidence. Current techniques typically do not provide an objective witness that can vouch for the integrity of the saved data nor the important metadata that might be saved with the data, such as timestamps.

One or more embodiments of the disclosure provide methods, apparatus and computer program products for validating sensor data using a blockchain. Blockchains are commonly associated with modern cryptocurrency, where the blockchain serves as a decentralized digital ledger for transactions. A peer-to-peer network and a distributed time-stamping server are often used to autonomously manage a blockchain database, in a known manner. Transactions are recorded in a blockchain in such a way that the registered transactions cannot be altered. In addition, transactions are signed by the private key of a user and include a signature, which is used to confirm that a given transaction originated from a given user.

Figure 1:
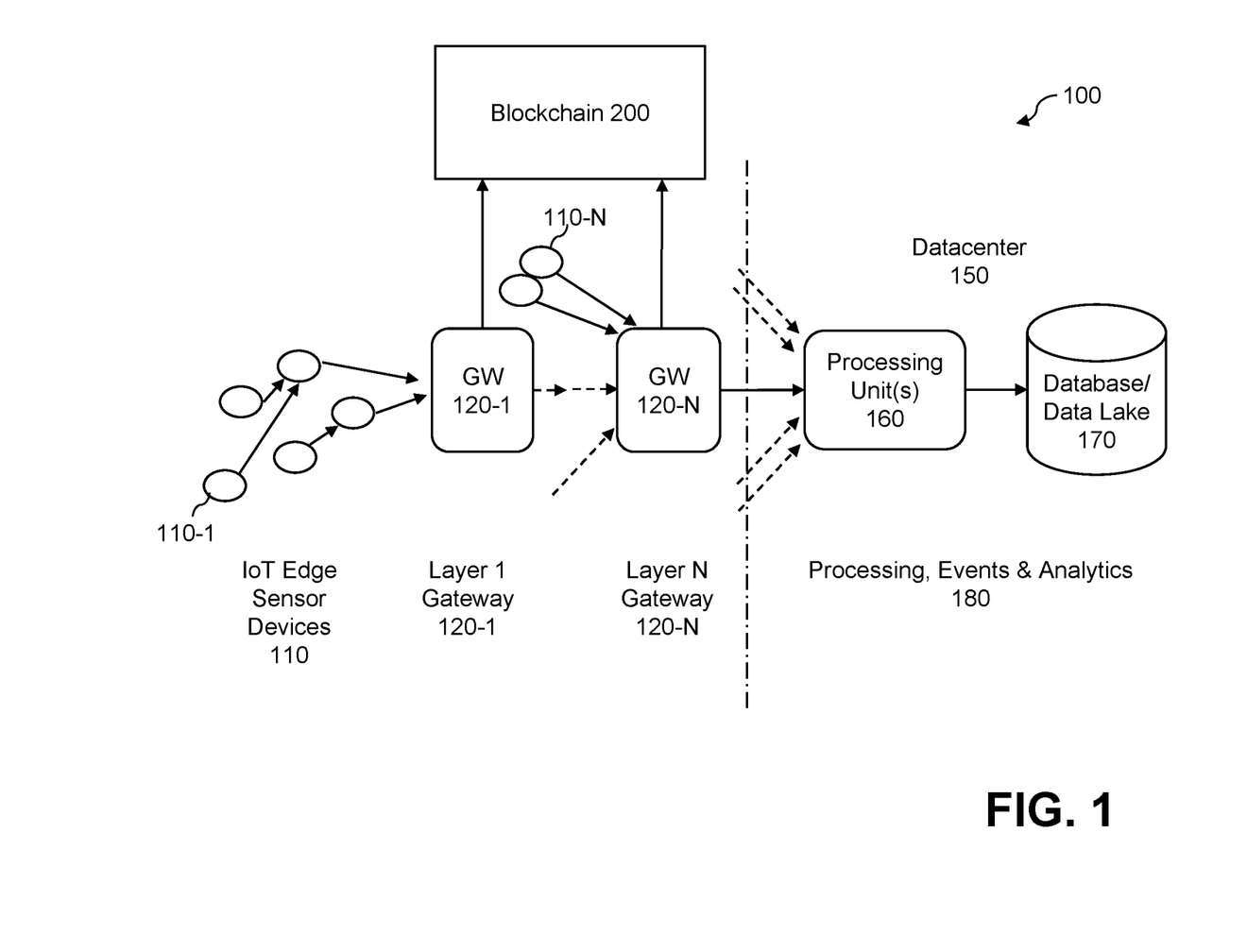
FIG. 1 illustrates an exemplary IoT system, according to one embodiment of the disclosure.

FIG. 1 illustrates an exemplary IoT system 100, according to one embodiment of the disclosure. As shown in FIG. 1, a plurality of IoT edge sensor devices 110-1 through 110-N (generally referred to herein as sensors 110) provide corresponding sensor readings to one or more layer 1 through layer N gateways 120-1 through 120-N. The IoT edge sensor devices 110-1 through 110-N comprise, for example, sensors, actuators and other devices that produce information or get commands to control the environment they are in. The gateways 120 comprise devices that consolidate communication and management of multiple IoT edge sensor devices 110. While gateways 120 are employed in the exemplary embodiment of FIG. 1, the gateways 120 are not mandatory. Gateways 120 are prevalent in numerous implementations, as networking capabilities of IoT edge sensor devices 110 are usually local in nature (e.g., power or connectivity) and the gateway 120 is used to connect to the Internet (not shown in FIG. 1).

The sensors 110 can be, for example, sensors designed for a specific purpose, such as thermometers, cameras and smoke detectors, as well as general-purpose sensor devices, such as, for example, smartphones and tablets that perform a sensing function, as would be apparent to a person of ordinary skill in the art. In one or more embodiments, the sensors 110 comprise the following public properties: unique identifier (ID), public key, geo-location, and clock timestamp (ongoing). In some embodiments, the sensors 110 have a private and public key pair. In some embodiments, the private key is a unique random number that will be used to sign the data. The sensor data that was created by a particular sensor 110 can be validated using the public key, as discussed hereinafter.

As shown in FIG. 1, the sensors 110 also have access to a blockchain 200, discussed further below in conjunction with FIG. 2. Although the sensors 110 access the blockchain 200 via the gateways 120 in FIG. 1, the sensors 110 can directly access the blockchain 200, as would be apparent to a person of ordinary skill in the art. The gateways 120 could optionally provide details to the sensors 110 on how to access the blockchain 200 directly.

The exemplary IoT system 100 of FIG. 1 further comprises a datacenter 150 comprising one or more processing unit(s) 160 and a database or data lake 170. The datacenter 150 performs one or more of processing, events and analytics functions 180, in a known manner.

Figure 2:
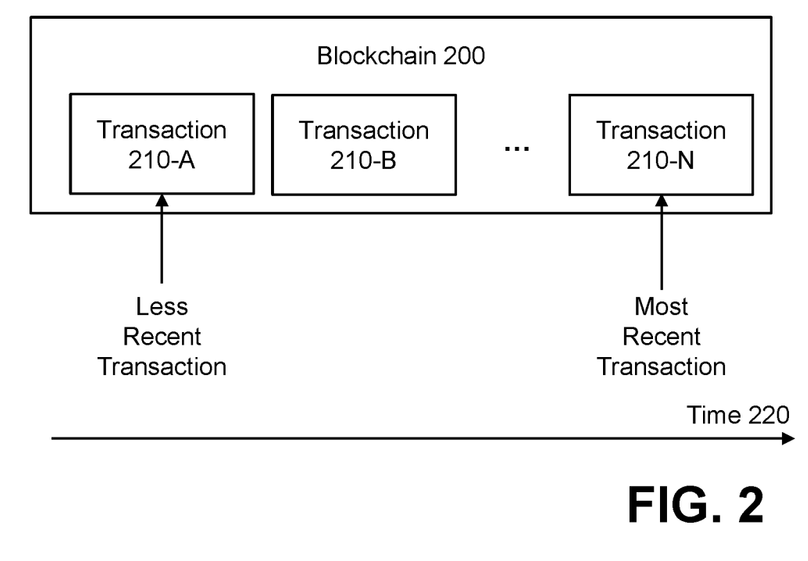
FIG. 2 illustrates an exemplary blockchain of FIG. 1 in further detail, according to some embodiments.

FIG. 2 illustrates the exemplary blockchain 200 of FIG. 1 in further detail, according to some embodiments. Generally, a blockchain 200, also referred to as a distributed ledger, is a technology that runs across disparate compute resources and supplies a secure transaction service. Transactions 210 have unique identifiers and cannot be disputed. Anything saved in the blockchain 200 will remain there and can be verified at any later time.

As shown in FIG. 2, the exemplary blockchain 200 comprises a plurality of transactions 210-A through 210-N. As noted above, transactions 210 are typically recorded in the blockchain 200 in such a way that the registered transactions 210 cannot be altered. In addition, transactions 210 are typically signed by the private key of a user and include a signature, which is used in one or more embodiments to confirm that a given transaction 210 originated from a given sensor 110.

In the example of FIG. 2, transaction 210-N comprises a most recent transaction, based on a time axis 220, and transaction 210-A comprises a less recent transaction (not necessarily the earliest transaction).

Figure 3:
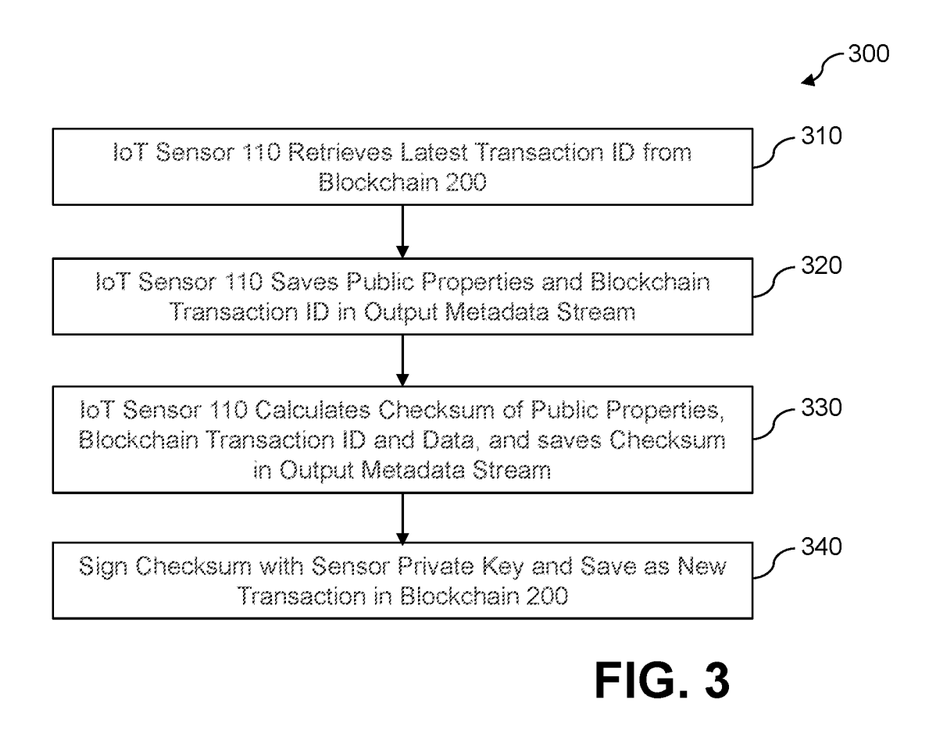
FIG. 3 is a flow chart illustrating a sensor data storage process, according to an embodiment of the disclosure.

FIG. 3 is a flow chart illustrating a sensor data storage process 300, according to an embodiment of the disclosure. As shown in FIG. 3, during step 310 of the exemplary sensor data storage process 300, a sensor 110 initially retrieves the latest transaction identifier from the blockchain 200. During step 320, the IoT sensor 110 saves its public properties and the retrieved latest blockchain transaction identifier in an output metadata stream (as discussed further below in conjunction with FIG. 4).

The sensor 110 then calculates a checksum of the public properties, the blockchain transaction identifier and the sensor data, and saves the checksum in the output metadata stream during step 330. While a checksum is employed in the exemplary embodiments, a hash function or another signature function can also be employed to generate a signature of the public properties, the blockchain transaction identifier and the sensor data, as would be apparent to a person of ordinary skill in the art.

Finally, during step 340, the sensor 110 signs the checksum with its sensor private key and saves the checksum as a new transaction in the blockchain 200.

Figure 4:
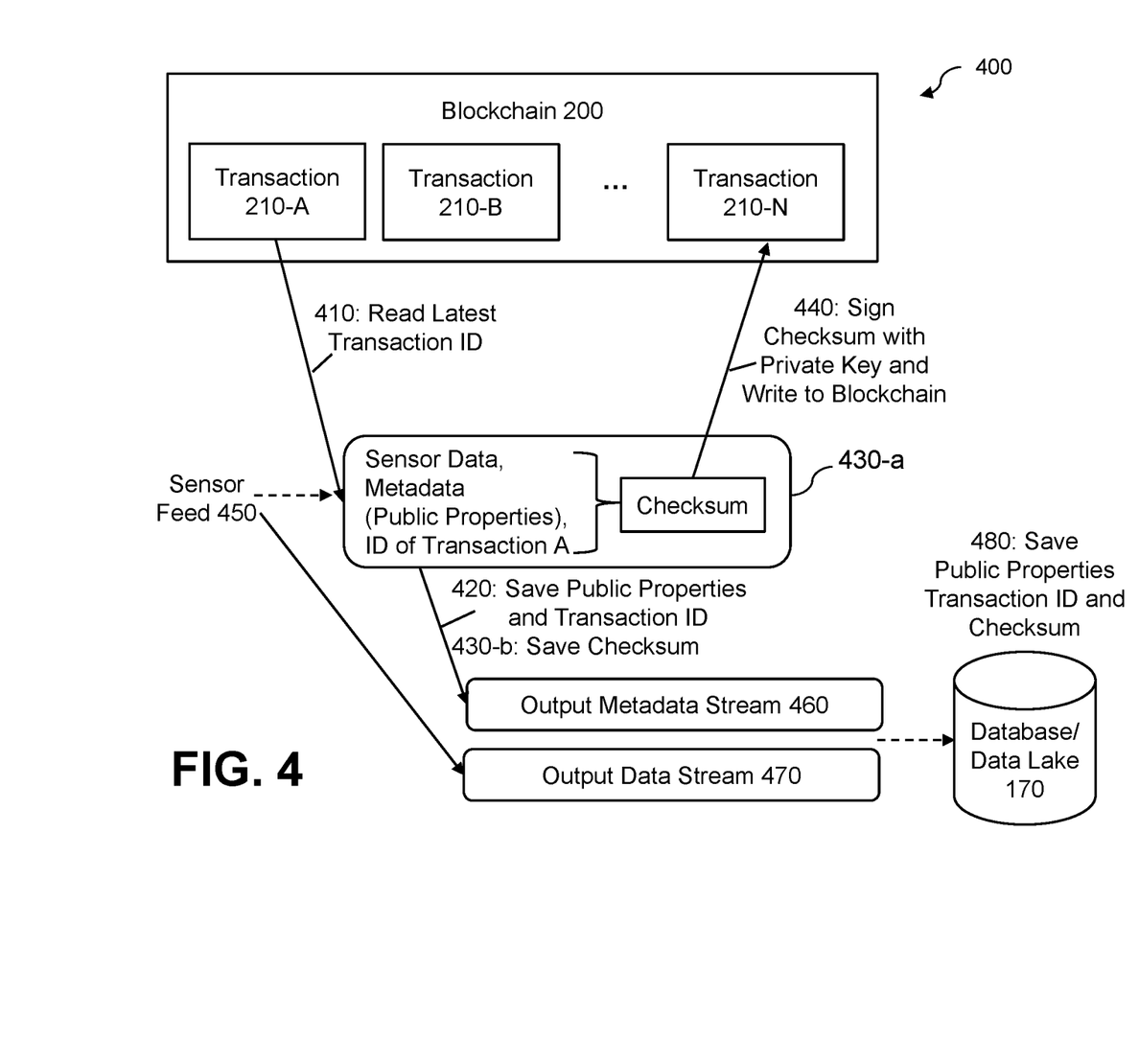
FIG. 4 illustrates the storage of sensor data in the blockchain of FIG. 2 using the sensor data storage process of FIG. 3, according to some validation embodiments of the disclosure.

FIG. 4 illustrates a storage 400 of sensor data in the blockchain 200 of FIG. 2 using the exemplary sensor data storage process 300 of FIG. 3, according to some validation embodiments of the disclosure. As shown in FIG. 4, a sensor feed 450 comprises the raw data recorded by input hardware of a particular sensor 110 (e.g., the video frames captured by the lens and CMOS). Sensor feed 450 reaches the main processing unit of the sensor 110 for storage by the sensor 110, or by the gateway 120, in the database 170 using the techniques shown in FIG. 4.

During step 410, the latest transaction identifier is read from the blockchain 200 (in a similar manner as step 310 of the sensor data storage process 300). During step 420, the public properties and the latest blockchain transaction identifier are saved in an output metadata stream 460.

During step 430-a, a checksum (or another signature) is calculated of the sensor data, the metadata (e.g., the public properties of the sensor 110), and the latest transaction identifier. During step 430-b, the calculated checksum is also saved in the output metadata stream 460. During step 480, the public properties, the latest blockchain transaction identifier and the checksum are stored in the database 170.

Finally, during step 440, the checksum is signed with the private key of the sensor 110 and saved as a new transaction in the blockchain 200.

Generally, the output metadata stream 460 accompanies the output data stream 470 and relates to the status of the sensor 110 at the time of recording sensor feed 450 (and of sending stream 470). In some embodiments, for example, output metadata stream 460 can include the geo-location of the sensor at this time, as well as the checksum of the data and the public key of the sensor 110.

The output data stream 470 is optionally linked to corresponding metadata in the output metadata stream 460 using the timestamps of the data stream that the metadata relates to. In some embodiments, the output data stream 470 has the output metadata stream 460 embedded within it. For example, a video file may contain fields for added information which could hold the metadata.

In the example of FIG. 4, the data is recorded between a time $T_1$ (e.g., the timestamp of Transaction 210-A) and a time $T_2$ (e.g., the timestamp of Transaction 210-N). The configuration shown in FIG. 4 can be used to validate the data and metadata of a particular sensor 110.

Figure 5:
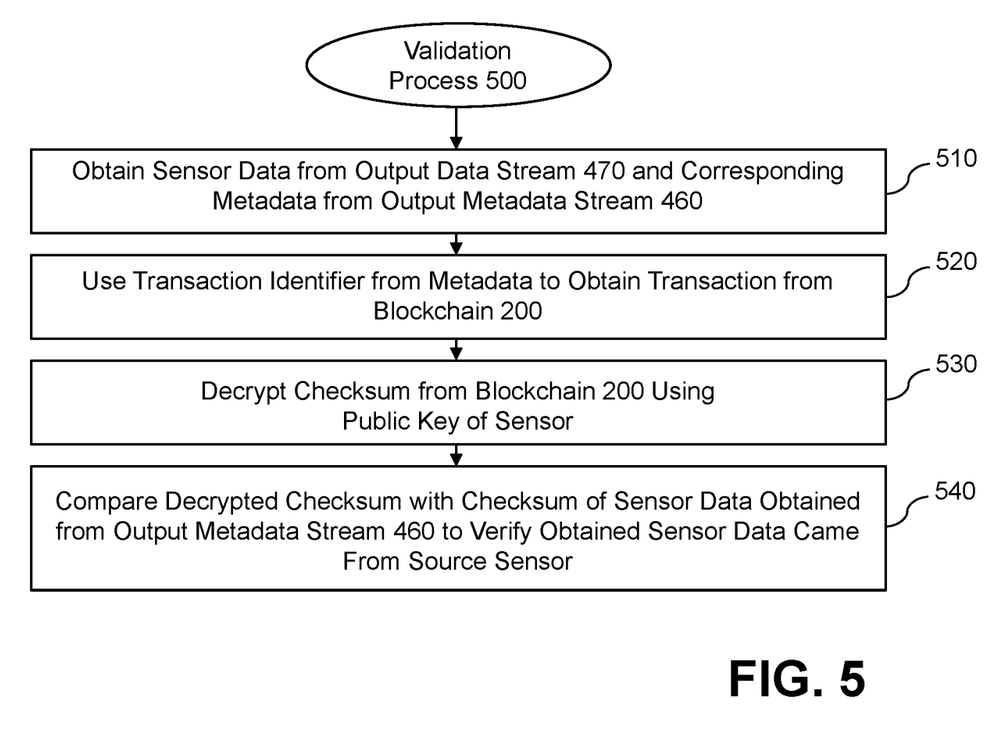
FIG. 5 is a flow chart illustrating a sensor data validation process, according to one embodiment of the disclosure.

FIG. 5 is a flow chart illustrating a sensor data validation process 500, according to one embodiment of the disclosure. As shown in FIG. 5, the exemplary sensor data validation process 500 initially obtains the sensor data from the output data stream 470 and the corresponding metadata from the output metadata stream 460 during step 510.

Thereafter, the sensor data validation process 500 uses the transaction identifier from the obtained metadata to obtain the corresponding transaction from the blockchain 200 during step 520.

During step 530, the checksum (or another signature) obtained from the blockchain 200 is decrypted using the public key of the origin sensor 110. In some embodiments, the validation of the sensor data will be performed against the database 170 (e.g., using output metadata stream 460 and output data stream 470) and not directly with an sensor 110. As noted above in conjunction with FIG. 4, the exemplary output metadata stream 460 comprises the public properties of the sensor 110, including the public key. Alternatively, if the sensor streams are obtained directly from the sensor device 110, then the public key of the sensor device 110 can also be obtained from the sensor device 110. In general, public keys are public, so they can be posted somewhere accessible to users (e.g., a Social Network). In some embodiments, a public directory is provided of sensors with their corresponding identification and public keys.

During step 540, the exemplary sensor data validation process 500 compares the decrypted checksum (from step 530) with the checksum of the sensor data obtained from the output metadata stream 460 to verify that the obtained sensor data came from the source sensor 110.

In some embodiments, it is assumed that the blockchain 200 is active (e.g., there are ongoing transactions on a regular and/or frequent basis). The blockchain 200 can be a dedicated ledger for the validated IoT system 100 of FIG. 1, for example. In addition, the blockchain 200 should be rather quick (e.g., it should take a matter of seconds to add a new transaction 210 to the ledger). Finally, in at least one embodiment, it is assumed that the sensor device 110 was not tampered with (e.g., the data recorded by sensors 110 is indeed the data that the sensors 110 sign and stamp in the blockchain 200).

As discussed above, the issue with respect to tamping is as follows: the data placed in the blockchain 200 in FIG. 4 was recorded before $T_2$ (timestamp of transaction 210-N) and that it was embedded with metadata after $T_1$ (timestamp of transaction 210-A), but it has not been proven that the actual data was not recorded before time $T_1$. In theory, someone might have tampered with sensor feed 450 of the sensor 110, having the sensor 110 sign and stamp data that was recorded at an earlier time. This is a theoretical problem, which cannot be solved in the general case: anyone with access to the internals of a sensor 110 can reach the private key of the sensor 110 and falsify any bit of information.

For audio/video sensors 110 in a controlled environment, visual or audible confirmation of the timestamp can be added to make sure that the data was indeed recorded after time $T_1$. For example, if a camera is placed in a police interrogation room, the latest blockchain transaction ID can be displayed on the wall (instead of a clock) or the recorded subjects can read this number out loud. It should, of course, be done in a way that is hard to "photoshop" the video or inject false information into the audio stream. In a controlled environment, the subjects in the recording can be ensured to relate to the transaction ID so it is an integral part of the captured data stream. This idea is similar to a photographed subject holding up a current newspaper to prove that the current time is after time $T_1$ (e.g., the day of paper).

In some embodiments, the disclosed sensor data validation techniques identify the particular sensor that captured incriminating data (e.g., a specific surveillance camera), and verify the integrity of the data, the location of the particular sensor and/or the particular time when the data was obtained. As noted above, the exemplary output metadata stream 460 of a sensor 110 contains the public properties of the corresponding sensor 110, such as its location. These public properties can be validated against the checksum stored in the blockchain 200. Since the checksum is signed by the private key and saved in the blockchain 200, the checksum cannot be disputed. Thus, the data was created by a particular IoT device, with the specific public properties, and the data was recorded before the timestamp of the ledger transaction. The latest blockchain transaction identifier saved in the checksum serves as a neutral timestamp. Thus, even if the IoT device clock is out of sync, there is an impartial proof that the data stream was embedded in the blockchain 200 starting from a certain timestamp.

One or more embodiments of the disclosure provide improved methods, apparatus and computer program products for validating sensor data. The foregoing applications and associated embodiments should be considered as illustrative only, and numerous other embodiments can be configured using the techniques disclosed herein, in a wide variety of different applications.

It should also be understood that the disclosed sensor data validation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for validating sensor data may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a sensor data validation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a sensor data validation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
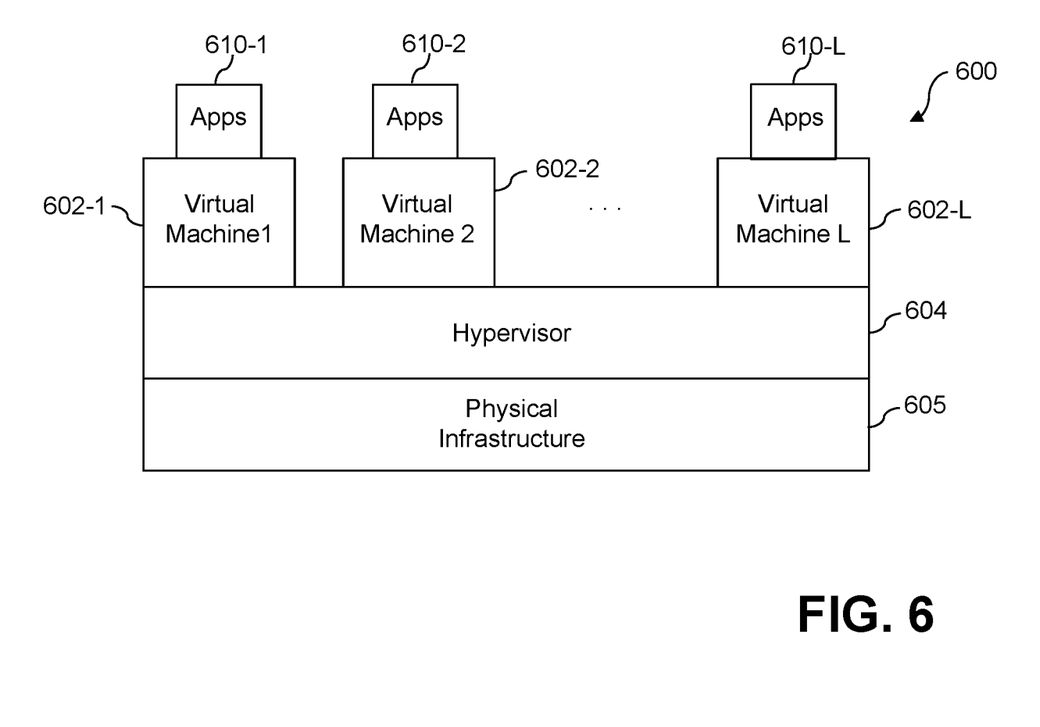
FIG. 6 illustrates an exemplary processing platform that may be used to implement at least a portion of one or more embodiments of the disclosure comprising a cloud infrastructure.

Referring now to FIG. 6, one possible processing platform that may be used to implement at least a portion of one or more embodiments of the disclosure comprises cloud infrastructure 600. The cloud infrastructure 600 in this exemplary processing platform comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

The cloud infrastructure 600 may encompass the entire given system or only portions of that given system, such as one or more of clients, servers, controllers, or computing devices in the system.

Although only a single hypervisor 604 is shown in the embodiment of FIG. 6, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 604 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the sensor data validation engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed sensor data validation apparatus may each run on a computer, server, storage device or other processing platform element. A given such element may be viewed as an example of what is more generally referred to herein as a "processing device." The cloud infrastructure 600 shown in FIG. 6 may represent at least a portion of one processing platform.

Figure 7:
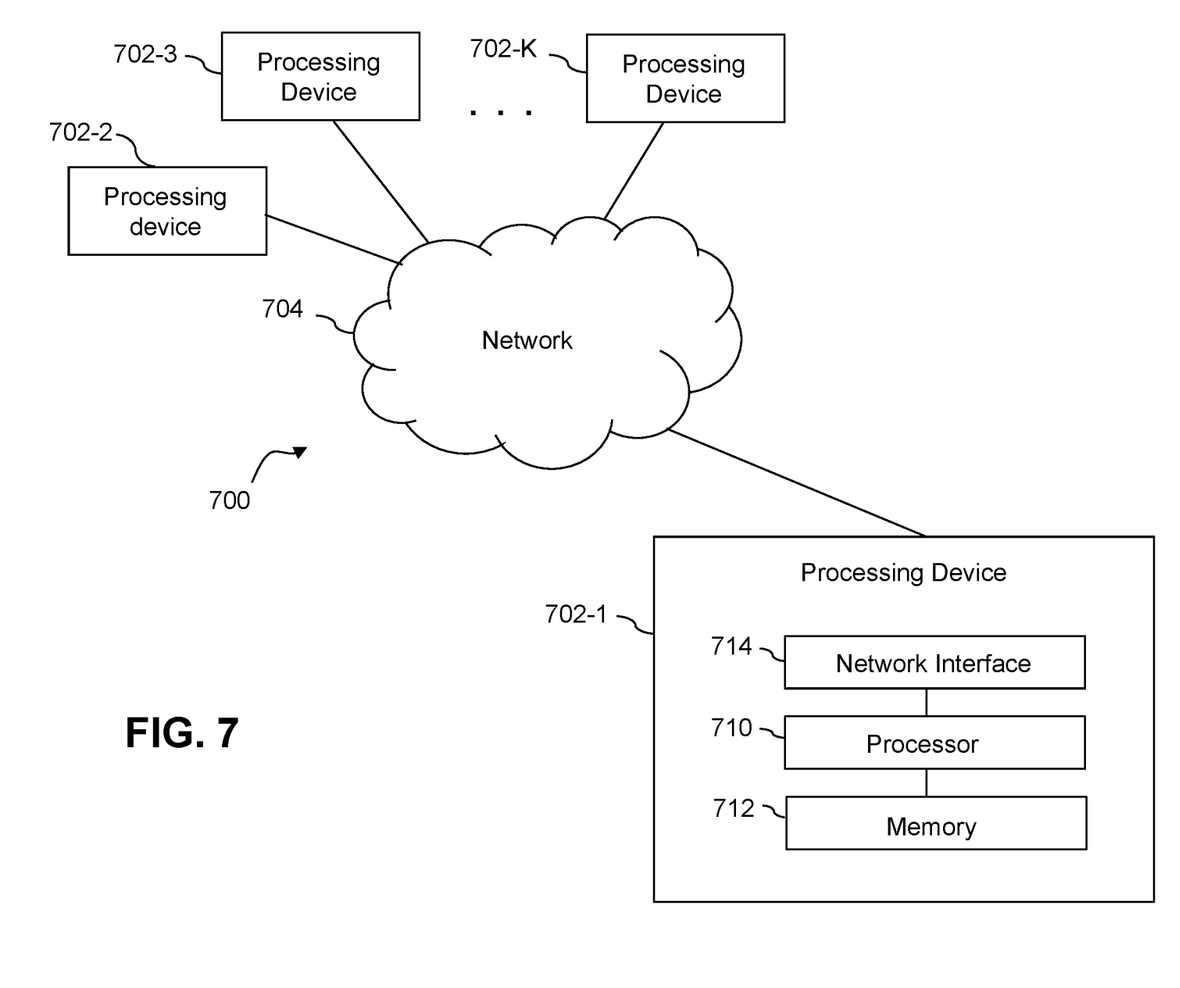
FIG. 7 illustrates another exemplary processing platform that may be used to implement at least a portion of one or more embodiments of the disclosure.

Another example of a processing platform is processing platform 700 shown in FIG. 7. The processing platform 700 in this embodiment comprises at least a portion of the given system and includes a plurality of processing devices, denoted 702-1, 702-2, 702-3, ... 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in FIGS. 3 through 5 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining sensor data from a sensor;
   retrieving a transaction identifier from a blockchain;
   saving one or more public properties of the sensor and the transaction identifier in an output metadata stream;
   calculating, using at least one processing device, a signature of the obtained sensor data, the one or more public properties of the sensor and the transaction identifier;
   saving, using said at least one processing device, the signature in the output metadata stream; and
   storing, using said at least one processing device, the signature encrypted with a private key of the sensor as a transaction in the blockchain, wherein the encrypted signature is decrypted using a public key of the sensor to validate the sensor data.

2. The method of claim 1, wherein the step of retrieving the transaction identifier further comprises retrieving a transaction identifier based at least in part on a time of one or more transactions in the blockchain.

3. The method of claim 1, wherein the sensor data is stored at a time between a time of the transaction associated with the retrieved transaction identifier and a time of the transaction that stores the encrypted signature.

4. The method of claim 1, further comprising the steps of obtaining the sensor data from an output data stream and corresponding metadata from an output metadata stream; using a transaction identifier from the corresponding metadata to obtain a corresponding transaction from the blockchain, wherein the corresponding transaction comprises the encrypted signature; decrypting the encrypted signature from the blockchain using a public key of the sensor; and comparing the decrypted signature with the signature of the sensor data obtained from the output metadata stream to establish that the obtained sensor data came from the sensor.

5. The method of claim 1, wherein the one or more public properties of the sensor comprise one or more of a sensor identifier of the sensor, a public key of the sensor, a geo-location of the sensor, and a timestamp.

6. The method of claim 1, wherein the blockchain is accessed one or more of (i) by said sensor and (ii) via a sensor gateway device that aggregates sensor data from a plurality of sensors.

7. The method of claim 1, wherein validation of the sensor data comprises one or more of validating a source of the sensor data, a location of the source of the sensor data and a time the sensor data was obtained.

8. A system, comprising:
a memory; and
at least one processing device, coupled to the memory, operative to implement the following steps:
obtaining sensor data from a sensor;
retrieving a transaction identifier from a blockchain;
saving one or more public properties of the sensor and the transaction identifier in an output metadata stream;
calculating, using at least one processing device, a signature of the obtained sensor data, the one or more public properties of the sensor and the transaction identifier;
saving, using said at least one processing device, the signature in the output metadata stream; and
storing, using said at least one processing device, the signature encrypted with a private key of the sensor as a transaction in the blockchain, wherein the encrypted signature is decrypted using a public key of the sensor to validate the sensor data.

9. The system of claim 8, wherein the step of retrieving the transaction identifier further comprises retrieving a transaction identifier based at least in part on a time of one or more transactions in the blockchain.

10. The system of claim 8, wherein the sensor data is stored at a time between a time of the transaction associated with the retrieved transaction identifier and a time of the transaction that stores the encrypted signature.

11. The system of claim 8, further comprising the steps of obtaining the sensor data from an output data stream and corresponding metadata from an output metadata stream; using a transaction identifier from the corresponding metadata to obtain a corresponding transaction from the blockchain, wherein the corresponding transaction comprises the encrypted signature; decrypting the encrypted signature from the blockchain using a public key of the sensor; and comparing the decrypted signature with the signature of the sensor data obtained from the output metadata stream to establish that the obtained sensor data came from the sensor.

12. The system of claim 8, wherein the one or more public properties of the sensor comprise one or more of a sensor identifier of the sensor, a public key of the sensor, a geo-location of the sensor, and a timestamp.

13. The system of claim 8, wherein the blockchain is accessed one or more of (i) by said sensor and (ii) via a sensor gateway device that aggregates sensor data from a plurality of sensors.

14. The system of claim 8, wherein validation of the sensor data comprises one or more of validating a source of the sensor data, a location of the source of the sensor data and a time the sensor data was obtained.

15. A computer program product, comprising a tangible machine-readable storage medium having encoded therein executable code of one or more software programs, wherein the one or more software programs when executed by at least one processing device perform the following steps:
obtaining sensor data from a sensor;
retrieving a transaction identifier from a blockchain;
saving one or more public properties of the sensor and the transaction identifier in an output metadata stream;
calculating, using at least one processing device, a signature of the obtained sensor data, the one or more public properties of the sensor and the transaction identifier;
saving, using said at least one processing device, the signature in the output metadata stream; and
storing, using said at least one processing device, the signature encrypted with a private key of the sensor as a transaction in the blockchain, wherein the encrypted signature is decrypted using a public key of the sensor to validate the sensor data.

16. The computer program product of claim 15, wherein the step of retrieving the transaction identifier further comprises retrieving a transaction identifier based at least in part on a time of one or more transactions in the blockchain.

17. The computer program product of claim 15, further comprising the steps of obtaining the sensor data from an output data stream and corresponding metadata from an output metadata stream; using a transaction identifier from the corresponding metadata to obtain a corresponding transaction from the blockchain, wherein the corresponding transaction comprises the encrypted signature; decrypting the encrypted signature from the blockchain using a public key of the sensor; and comparing the decrypted signature with the signature of the sensor data obtained from the output metadata stream to establish that the obtained sensor data came from the sensor.

18. The computer program product of claim 15, wherein the one or more public properties of the sensor comprise one or more of a sensor identifier of the sensor, a public key of the sensor, a geo-location of the sensor, and a timestamp.

19. The computer program product of claim 15, wherein the blockchain is accessed one or more of (i) by said sensor and (ii) via a sensor gateway device that aggregates sensor data from a plurality of sensors.

20. The computer program product of claim 15, wherein validation of the sensor data comprises one or more of validating a source of the sensor data, a location of the source of the sensor data and a time the sensor data was obtained.

* * * * *